US006748585B2

(12) United States Patent
Proebsting et al.

(10) Patent No.: US 6,748,585 B2
(45) Date of Patent: Jun. 8, 2004

(54) COMPUTER PROGRAMMING LANGUAGE PRONOUNS

(75) Inventors: Todd A. Proebsting, Redmond, WA (US); Benjamin G. Zorn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 09/725,654

(22) Filed: Nov. 29, 2000

(65) Prior Publication Data

US 2002/0166114 A1 Nov. 7, 2002

(51) Int. Cl.[7] .............................. G06F 9/45; G06F 9/44

(52) U.S. Cl. ........................ 717/136; 717/140; 717/141; 717/142; 717/143; 717/114; 717/116

(58) Field of Search ................................. 717/142, 114, 717/115, 116, 118, 143, 136, 140, 141

(56) References Cited

U.S. PATENT DOCUMENTS

| | | | | | |
|---|---|---|---|---|---|
| 5,339,433 | A | * | 8/1994 | Frid-Nielsen | 717/141 |
| 5,555,419 | A | * | 9/1996 | Arsenault | 717/136 |
| 5,560,010 | A | * | 9/1996 | Albert | 717/117 |
| 5,715,460 | A | * | 2/1998 | Acker et al. | 717/140 |
| 6,102,966 | A | * | 8/2000 | Tyma | 717/118 |
| 6,195,792 | B1 | * | 2/2001 | Turnbull et al. | 717/110 |
| 6,298,481 | B1 | * | 10/2001 | Kosaka et al. | 717/110 |
| 6,311,327 | B1 | * | 10/2001 | O'Brien et al. | 717/114 |
| 6,427,228 | B1 | * | 7/2002 | Wigger | 717/111 |
| 6,434,742 | B1 | * | 8/2002 | Koepele, Jr. | 717/142 |
| 6,523,172 | B1 | * | 2/2003 | Martinez-Guerra et al. | 717/112 |

OTHER PUBLICATIONS

R. C. Hutchins, S. Hemmady, "How to Write Awk and Perl Scripts to Enable your EDA Tools to Work Together", 1996, ACM.*

M. Naik, R. Kumar, "Object–Oriented Symbol Management in Syntax–Directed Compiler Systems", 1999, ACM, v.34(6), p. 58–67.*

S. Srinivasan, "Advanced Perl Programming", 1997, Sebastopol, CA: O'Reilly, Chapter 1, Sec. 1.1 Referring to Existing Variables, p. 1–4.*

* cited by examiner

*Primary Examiner*—Todd Ingberg
*Assistant Examiner*—Qamrun Nahar
(74) *Attorney, Agent, or Firm*—Merchant & Gould P.C.

(57) ABSTRACT

Programming language constructs called pronouns and referents, and a method, system, and apparatus for translating computer source code that contains the pronouns and referents. A referent is any semantic or syntactic construct in the source code (e.g., a statement, a portion of a statement, an expression, or a value) to which a pronoun refers. A pronoun is a programming-language defined source-code symbol or a sequence of symbols that refers to the referent. As a result, pronouns eliminate the need to define new names or macros for repeated program segments. When a translator encounters the pronoun in the source code, the translator searches the source code for the referent and substitutes the referent for the pronoun. Thus, by using pronouns and referents, the programmer can write programs faster and easier and eliminate program redundancy without losing readability.

31 Claims, 13 Drawing Sheets

675

| SYMBOL (680) | TYPE (685) | DEFINITION OF REFERENT (690) |
|---|---|---|
| $() | EXPLICIT PRONOUN | REFERENT IS PROGRAMMER-DEFINED BY MOST-RECENTLY PARENTHESIZED EXPRESSION |
| ’’ | EXPLICIT PRONOUN | REFERENT IS PROGRAMMER-DEFINED |
| ’’’ | EXPLICIT PRONOUN | REFERENT IS LANGUAGE-DEFINED |
| $= | EXPLICIT PRONOUN | REFERENT IS MOST-RECENTLY ASSIGNED VALUE |
| $1 | EXPLICIT PRONOUN | REFERENT IS FUNCTION PARAMETER BY POSITION |
| ... | EXPLICIT PRONOUN | REFERENT IS LANGUAGE DEFINED |
| $retval | EXPLICIT PRONOUN | REFERENT IS LANGUAGE DEFINED TO BE THE MOST-RECENTLY RETURNED VALUE FROM A FUNCTION |

| NAME | REFERENT | |
|---|---|---|
| | PROGRAMMER-DEFINED | LANGUAGE-DEFINED |
| FULL NAME | 711<br>a.b.c.d.e=x + y ~705<br>a.b.c.d.f=x + z ~710<br>712 | (N/A) |
| EXPLICIT PRONOUN | 721-1<br>(a.b.c.d).e=x + y ~715<br>$().f=x + z ~720<br>722<br>721-2<br>(a.b.c.d).e=x + y ~725<br>".f=x + z ~730<br>731 | 741<br>a.b.c.d.e=x + y ~735<br>'''.f=x + z ~740<br>742 |
| ANONYMOUS PRONOUN | 751<br>(a.b.c.d).e=x + y ~745<br>.f=x + z ~750<br>752 | 761<br>a.b.c.d.e=x + y ~755<br>.f=x + z ~760<br>762 |

| NAME | REFERENT | |
|---|---|---|
| | PROGRAMMER-DEFINED | LANGUAGE-DEFINED |
| FULL NAME | 816<br>foo.diffusion_array[i]=x 805<br>817 foo.diffusion_array[j]=y 810<br>818 foo.diffusion_array[k]=z 815 | (N/A) |
| EXPLICIT PRONOUN | 835<br>820 (foo.diffusion_array)[i]=x<br>840 #() [j]=y 825<br>#() [k]=z 830<br>845 | 865<br>foo.diffusion_array[i]=x 850<br>'''[j]=y 855<br>866 '''[k]=z 860 |
| ANONYMOUS PRONOUN | 885<br>870 (foo.diffusion_array)[i]=x<br>[j]=y 875<br>[k]=z 880<br>890 | 898<br>foo.diffusion_array[i]=x 892<br>[j]=y 894<br>[k]=z 896<br>897 |

FIG. 8 spatial_dist.pt.x.velocity = z * c —1005 foo ($=)
       ~1015 fopen("foo.txt", "r") ~1055 if (#retval !=0) —1060 print "error opening file"

if (foo(a,b,c) > 0) {
    if (bar(a,b,c) > 0) {
        if ($foo > $bar) {
            print ("foo bigger than bar")
        }
    }
}

```
          1200           1221              1226
1205 ─ function  fo(a:  =  3,  b:  ="hello",  c)
       end  function
              1220              1225
1210 ─ foo  (~,  "bye",  ~)

1215 ─ foo  ( ,  "bye",  )
            1235        1230
```

```
          1300           1305              1310
1305 ─ function  min  (parameter1,  parameter2)
                 1315   1320
             if  $1  <  $2  then  return  $1

             else  return  $2

       end
```

1400

```
1405  x = (a.b.c.d)
      if y {
            i = (0)   1410
      }
            else {
                  r = (3.14)   1415
      }
      write ($())   1420
```

```
1455  (a_long_variable_name)[I] = 10
1460  (another_long_name.a_long_field_name).x=5
1465  $()[I+1] = 11
1470  $().y = y
```

FIG. 14B

COMPUTER PROGRAMMING LANGUAGE PRONOUNS

TECHNICAL FIELD

This invention relates generally to computers, and more particularly to names in a computer programming language.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© Microsoft Corporation, 2000. All Rights Reserved.

BACKGROUND OF THE INVENTION

A natural language is expression that humans use to communicate with one another, e.g. English. Natural languages are highly effective at compressing and unambiguously expressing complex concepts. Words, such as names, provide a concise encoding that provides significant compression with little loss of information.

Compression is achieved in natural languages in two ways: large vocabularies and pronouns. Natural languages have very limited forms of user-defined names (proper nouns) and instead support great expressiveness by providing large fixed vocabularies. Further compression is achieved by providing pronouns whose referent is context dependent. For example, most people would consider the sentence "The Archbishop of Canterbury entered the pub where the Archbishop of Canterbury ordered a pint of ale," too long. Substituting the pronoun "he" for the second occurrence of "the Archbishop of Canterbury," improves the sentence considerably—making it easier to read (and write). Note that the use of a pronoun does not require creation of a new name in order to shorten the sentence.

Unlike natural languages, computer programming languages (expressions that computers understand) typically have a small fixed vocabulary, such as built-ins and keywords, and a larger user-defined vocabulary, such as function names, types, and variables. As a result, a significant part of the effort of writing a computer program is deciding what things to name and what to name them. While programmers have many naming decisions to make, languages typically provide few mechanisms beyond definition facilities to help them make these decisions.

Every additional name added to a program has associated costs and adds to the difficulty of writing the program. The programmer has the burden of choosing an appropriate name, declaring the entity being named, and ensuring that the name does not conflict with pre-existing names. As more names are introduced, the mental task of remembering all names and their scopes becomes increasingly difficult. Likewise, a person reading a program with many unfamiliar names has the burden of first knowing and then remembering each name's meaning.

In the early days of computers, programming languages forced names to be short, and thus cryptic, because the name itself took up computer memory, which was expensive. This increased the burden on the programmer and reader in knowing and remembering the meaning of the name. Now that memory is inexpensive, names in programming languages are much longer, which potentially helps readability, but long names are difficult and annoying to write, especially when multiple programming-language statements use the same long name repeatedly.

From the earliest designs, prior programming languages have attempted to simplify naming and make programs easier to write and read with mixed success. For example:

1) The Fortran programming language has implicit type declarations based on the starting character of a variable name. But, this solution only deals with declaring a variable and does not help with using a variable.
2. Many programming languages have macro processors that allow one code statement to be substituted with another statement or statements. But, macros require the creation of a new name: the macro name, which complicates rather than simplifies naming. Also, macros are preprocessing transformations, and hence, have syntactic effect but do not perform semantic analysis, which limits their usefulness. Further, macros are often awkward to use and hard to read.
3. Many programming languages have predefined symbols that refer to predefined objects or functions. Also, shorthand notations for naming aggregates—plural values—are common in programming languages. Array assignment, list and array comprehensions, and array slicing notations are all examples of plural shorthands. Examples of pre-defined symbols include:
   a) The Java programming language uses "this" to refer to the current object within a method.
   b) The AWK programming language uses "$1" to refer to first field of a parsed input record.
   c) The Perl programming language provides a number of pre-defined symbols. First, Perl allows referring to a sub-match of a regular expression by putting the sub-expression inside parentheses and then referring to the matched value as "$n" for the $n^{th}$ such sub-expression. Second, Perl provides "@_" for accessing a subroutine's parameter array. Third, Perl provides the variable "$_", which refers, depending on context, to the current input record, the current pattern string, or the current for each loop iterator variable, among other things. Finally, Perl also defines many arguments to built-in functions to have defaults that are defined by the context.
   d) The Pascal programming language provides a "with" construct, which eliminates the need to repeat references to the same structure. Pascal also provides a "write" procedure, which takes an optional first argument to specify the output file—if it is missing, it defaults to "output."
   e) Object-oriented languages such as C++, SmallTalk, and Java provide shorthand forms for referring to the instance object inside methods of the object's class. For example, foo( ) may be a shorthand for this.foo( ).
   f) Most languages with package mechanisms, such as Ada, provide a "use" declaration that eliminates the need to qualify fully external references to symbols in other packages.
   g) The C programming language provides the shorthand "X++" for "X=X+1."

Unfortunately, all of these pre-defined symbols suffer from the problem that the predefined objects or functions are defined by the programming language and not the programmer, which restricts their usefulness. Thus, in order to boost programmer productivity, a solution is needed that will increase the ease of writing and reading computer programs, achieve conciseness in programs without resorting to creating new names, and ease the difficulties in using long names in repeated statements.

SUMMARY OF THE INVENTION

The above-mentioned shortcomings, disadvantages and problems are addressed by the present invention, which will be understood by reading and studying the following specification. The present invention encompasses programming language constructs called pronouns and referents, and a method, system, and apparatus for translating computer source code that contains the pronouns and referents.

A referent is any semantic or syntactic construct in the source code (e.g., a statement, a portion of a statement, an expression, or a value) to which a pronoun refers. A pronoun is a programming-language defined source-code symbol or a sequence of symbols that refers to the referent. As a result, pronouns eliminate the need to define new names or macros for repeated program segments. When a translator encounters the pronoun in the source code, the translator searches the source code for the referent and substitutes the referent for the pronoun. Thus, by using pronouns and referents, the programmer can write programs faster and easier and eliminate program redundancy without losing readability.

BRIEF DESCRIPTION OF THE DRAWINGS

FIGS. 6*a* and 6*b* are block diagrams illustrating a system-level overview of an exemplary embodiment of the invention.

FIG. 7 is a table of code fragments that shows the relationship of full names, explicit pronouns, anonymous pronouns, programmer-defined referents, and language-defined referents.

FIG. 8 is a table of code fragments that shows the relationship of full names, explicit pronouns, anonymous pronouns, programmer-defined referents, and language-defined referents for subscripted arrays.

FIGS. 14A and 14B are block diagrams of program statements that illustrate the scope of pronoun binding.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical and other changes may be made without departing from the spirit or scope of the present invention. The following detailed description is, therefore, not to be taken in a limiting sense, and the scope of the present invention is defined only by the appended claims.

Introduction

A computer operates under the control of programs consisting of coded instructions called "object code" that execute on the computer. But, object code is not readily understood by humans, so a human programmer typically writes programs in a high-level programming language, such as BASIC, JAVA, PERL, PASCAL, C, C++, or the like, which are easier to understand.

High-level languages generally have a precise syntax that defines certain permitted structures for statements in the language and their meaning. The high-level language statements, called "source code," are then translated into object code. Thus, the terms, "source code" and "object code," describe the form of a program prior to and after translation, respectively. Accordingly, the term "source code" generally refers to a program in its high-level programming language form. "Object code," on the other hand, generally refers to the program in the form of the coded instructions generated by the translator that are executable on a computer.

In the early years of computers, memory was expensive, so in order to save memory, programming languages restricted the length of source-code variable names, which refer to memory locations, to only a few characters. Thus, it was quite common to see computer programs containing repeated statements with similar, short, cryptic expressions, such as in FIG. 1, which shows program fragment 100 containing variable zazf 105, which is an array having three elements indexed by (1), (2), and (3). Program fragment 100 also contains variables o 110, h 115, and g 120, which are assigned to the respective elements of zazf 105. This required the programmer to know and remember the meaning of variable names "zazf," "o," "h," and "g," which appear as gibberish to the reader. This made it difficult to read and understand a program that had many variables, which was quite common.

Figure 1:
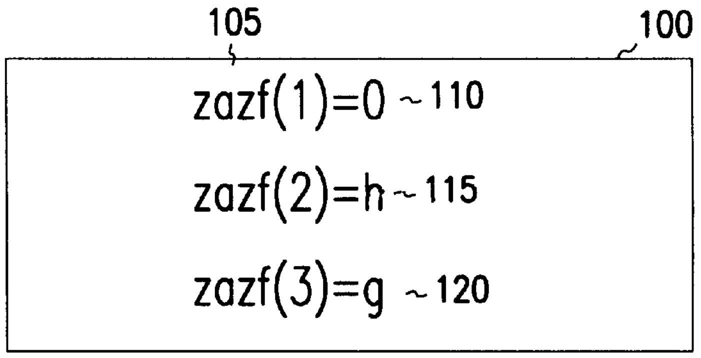
FIG. 1 is a block diagram of a code fragment containing statements with short variable names and redundant expressions.

Although FIG. 1 is nonsensical to read, at least it is relatively quick and easy to write. But, recent technological advances have made memory inexpensive and abundant, so programming languages now allow very long variable names and expressions. So, it has become common to see statements in a computer program such as in FIG. 2, which shows program fragment 200 containing expression zoo. animals.zebra.food 205, which has three elements indexed by (1), (2), and (3). Program fragment 200 also contains variables oats 210, hay 215, and grass 220, which are assigned to the respective elements of zoo.animals.zebra. food 205.

Figure 2:
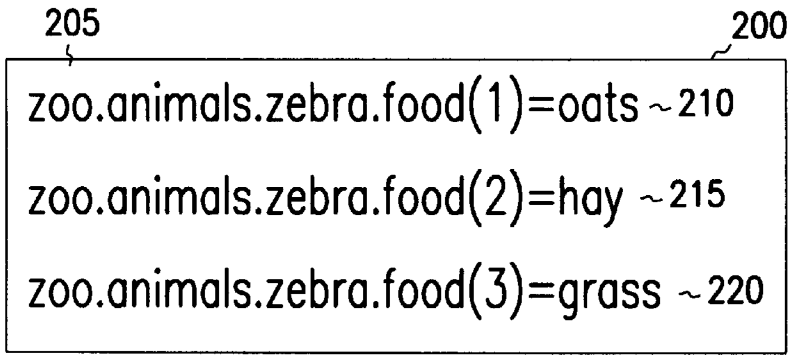
FIG. 2 is a block diagram of a code fragment containing statements with long variable names and redundancies.

Notice that while the meaning of the statements in FIG. 2 is clearer than in FIG. 1, the time needed for the programmer to write the FIG. 2 statements is longer. Further, it is annoying to repeatedly write long expressions. Thus, longer variable names and expressions gain potential readability (by no means assured) at the expense of writeability.

Figure 3:
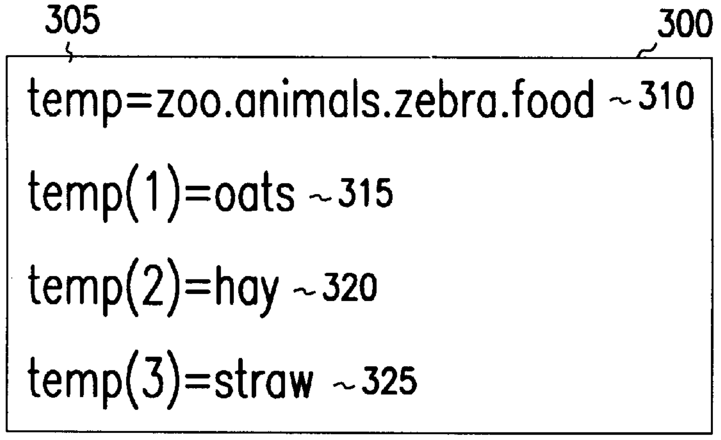
FIG. 3 is a block diagram of a code fragment that uses a temporary variable to deal with redundancies.

It is possible to eliminate some kinds of redundancy by naming redundant entities either through variable bindings or macro substitutions—and then repeating that name, such as in FIG. 3, which shows program fragment 300 containing expression zoo.animals.zebra.food 310, which has three elements indexed by (1), (2), and (3). Program fragment 300 also contains temp 305, which is a variable bound to zoo.animals.zebra.food 310, such that when "temp" is subsequently used, the compiler substitutes "zoo.animals.zebra. food" for it. Thus, variables oats 315, hay 320, and grass 325 are assigned to the respective elements of zoo.animals. zebra.food 310 by assigning them to respective elements of temp 305. Using temporary variables, such as "temp" in FIG. 3, can reduce redundancy, but they are tedious to invent and cumbersome to use.

Figure 4A:
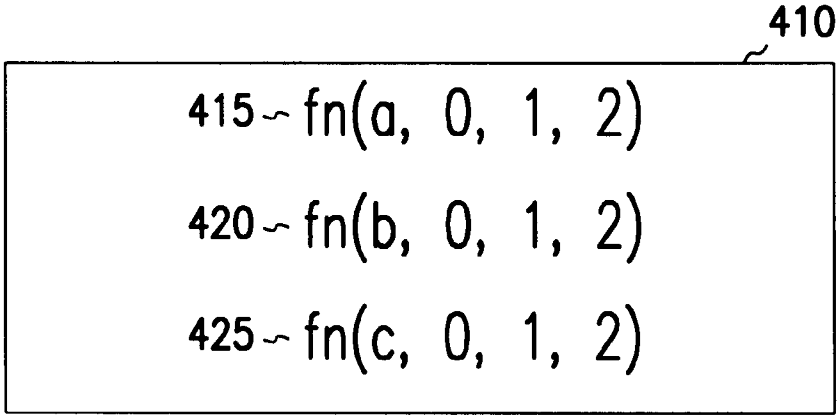
FIG. 4*a* is a block diagram of a code fragment containing statements with a function and redundancies.
Figure 4B:
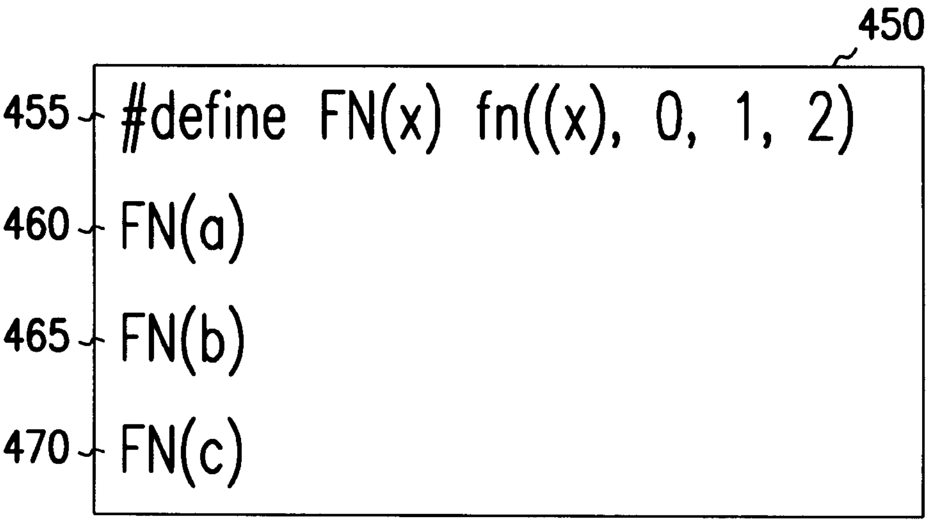
FIG. 4*b* is a block diagram of a code fragment that uses a macro to deal with function redundancies.

An approach that programming languages have used in an attempt to make names easier to handle is macro processing. But, macros suffer from the problem that the programmer is required to define a new name: the macro name. Further the macro solution is awkward and hard to read. Consider the example of FIG. 4A, which shows code statements with redundant portions. FIG. 4A contains code fragment 410, which contains function calls fn(a, 0, 1, 2) 415, fn(b, 0, 1, 2) 420, and fn(c, 0, 1, 2) 425. The macro solution to the redundant statements in FIG. 4A is shown in FIG. 4B, which is awkward, hard to read, and requires the new name "FN". FIG. 4B contains code fragment 450, which contains #define FN(x) fn((x), 0, 1, 2) 455, FN(a) 460, FN(b) 465, and FN(c) 470.

Thus, in order to boost programmer productivity, a solution is needed that will increase the ease of writing and reading computer programs, achieve conciseness in programs without resorting to creating new names, and ease the difficulties in using long names in repeated statements.

The present invention encompasses programming language constructs called pronouns and referents, and a method, system, and apparatus for translating computer source code that contains the pronouns and referents. A referent is any semantic or syntactic construct in the source code (e.g., a statement, a portion of a statement, an expression, or a value) to which a pronoun refers. A pronoun is a programming-language defined source-code symbol or a sequence of symbols that refers to the referent. As a result, pronouns eliminate the need to define new names or macros for repeated program segments. When a translator encounters the pronoun in the source code, the translator searches the source code for the referent and substitutes the referent for the pronoun. Thus, by using pronouns and referents, the programmer can write programs faster and easier and eliminate program redundancy without losing readability.

Hardware and Operating Environment

Figure 5:
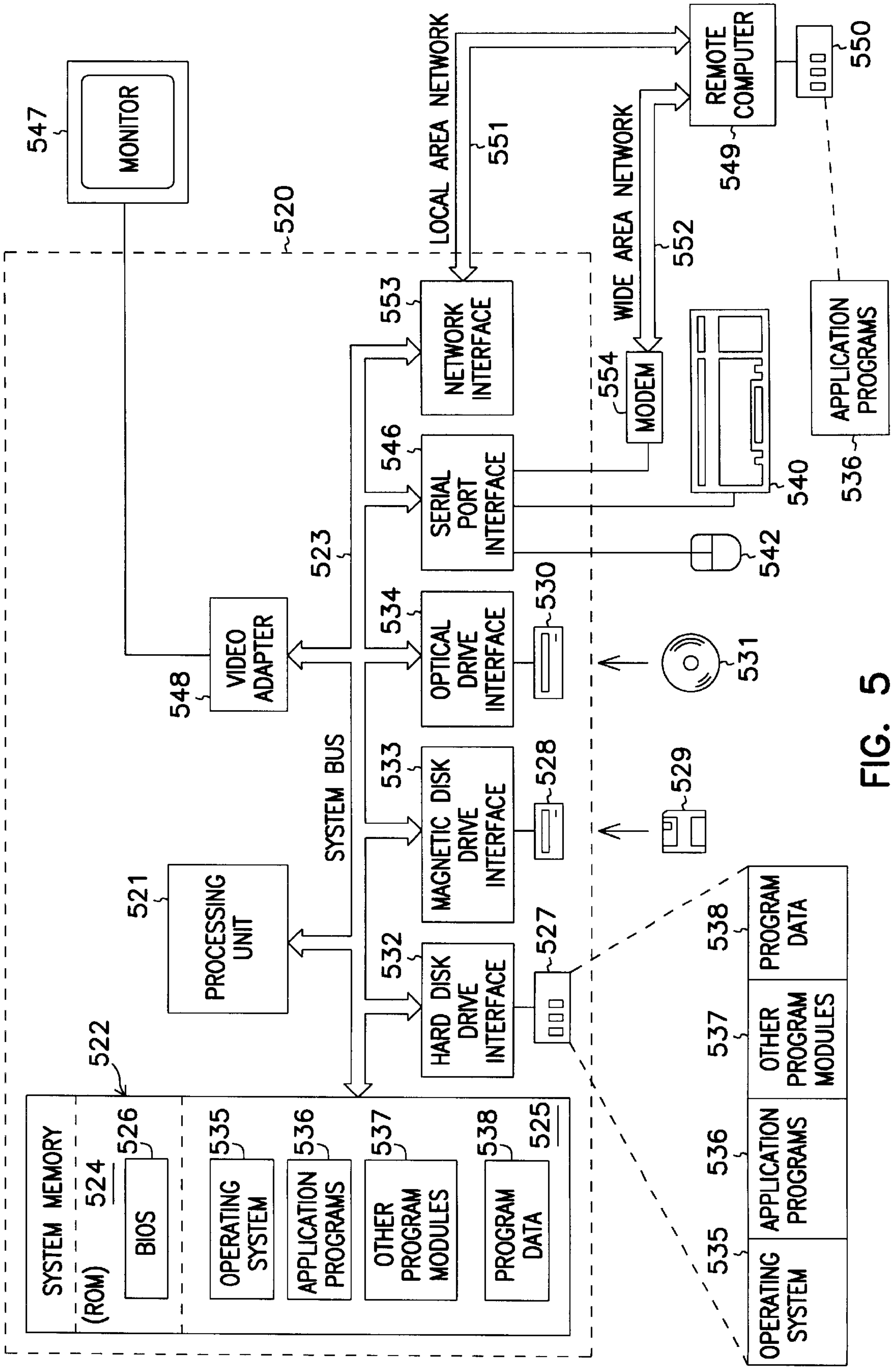
FIG. 5 is a block diagram of the hardware and operating environment in conjunction with which embodiments of the invention may be practiced.

FIG. 5 is a block diagram of the hardware and operating environment in conjunction with which embodiments of the invention may be practiced. The description of FIG. 5 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 5 for implementing the invention includes a general purpose computing device in the form of a computer 520, including a processing unit 521, a system memory 522, and a system bus 523 that operatively couples various system components include the system memory to the processing unit 521. There may be only one or there may be more than one processing unit 521, such that the processor of computer 520 comprises a single central-processing unit (CPU), or a plurality of processing units, commonly referred to as a parallel processing environment. The computer 520 may be a conventional computer, a distributed computer, or any other type of computer; the invention is not so limited.

The system bus 523 may be any of several types of bus structures including a memory bus or memory controller, a peripheral bus, and a local bus using any of a variety of bus architectures. The system memory may also be referred to as simply the memory, and includes read only memory (ROM) 524 and random access memory (RAM) 525. A basic input/output system (BIOS) 526, containing the basic routines that help to transfer information between elements within the computer 520, such as during start-up, is stored in ROM 524. The computer 520 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 are connected to the system bus 523 by a hard disk drive interface 532, a magnetic disk drive interface 533, and an optical disk drive interface 534, respectively. The drives and their associated computer-readable media provide nonvolatile storage of computer-readable instructions, data structures, program modules and other data for the computer 520. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 529, optical disk 531, ROM 524, or RAM 525, including an operating system 535, one or more application programs 536, other program modules 537, and program data 538. A user may enter commands and information into the personal computer 520 through input devices such as a keyboard 540 and pointing device 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a parallel port, game port, or a universal serial bus (USB). A monitor 547 or other type of display device is also connected to the system bus 523 via an interface, such as a video adapter 548. In addition to the monitor, computers typically include other peripheral output devices (not shown), such as speakers and printers.

The computer 520 may operate in a networked environment using logical connections to one or more remote computers, such as remote computer 549. These logical connections are achieved by a communication device coupled to or a part of the computer 520; the invention is not limited to a particular type of communications device. The remote computer 549 may be another computer, a server, a router, a network PC, a client, a peer device or other common network node, and typically includes many or all of the elements described above relative to the computer 520, although only a memory storage device 550 has been illustrated in FIG. 5. The logical connections depicted in FIG. 5 include a local-area network (LAN) 551 and a wide-area network (WAN) 552. Such networking environments are commonplace in offices, enterprise-wide computer networks, Intranets and the Internet.

When used in a LAN-networking environment, the computer 520 is connected to the local network 551 through a network interface or adapter 553, which is one type of communications device. When used in a WAN-networking environment, the computer 520 typically includes a modem 554, a type of communications device, or any other type of communications device for establishing communications over the wide area network 552, such as the Internet. The modem 554, which may be internal or external, is connected to the system bus 523 via the serial port interface 546. In a networked environment, program modules depicted relative to the personal computer 520, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 6A:
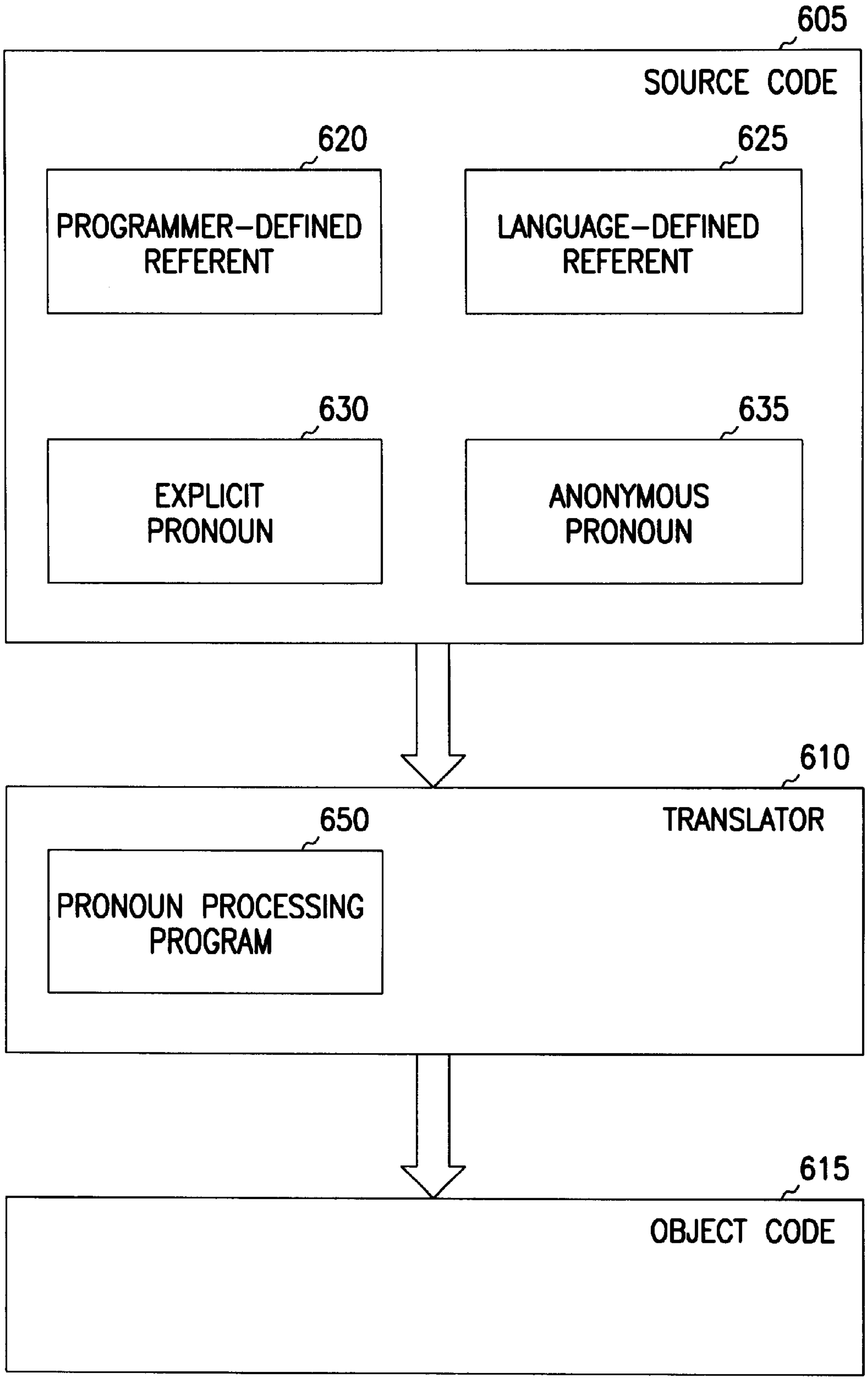

FIG. 6*a* is a block diagram illustrating a system-level overview of an exemplary embodiment of the invention. FIG. 6*a* illustrates source code 605, translator 610, and object code 615, all of which can be contained in system memory 522. In one embodiment, translator 610 translates source code 605 into object code 615 as further described below. In another embodiment, translator 610 interprets source code 605.

Source code 605 contains programming language statements that are generally understandable by a human. Source code 605 contains programmer-defined referent 620, language-defined referent 625, explicit pronoun 630, and anonymous pronoun 635, all of which are programming language statements or portions thereof.

Programmer-defined referent 620 is any semantic or syntactic construct in the source code (e.g., a statement, a portion of a statement, an expression, or a value) that the programmer has identified to translator 610 as an item to which a pronoun can refer. In one embodiment, the programmer identifies a referent by enclosing it in parentheses, but the programming language implemented by translator 610 could specify any means of identifying referents.

Language-defined referent 625 is any semantic or syntactic construct in the source code (e.g., a statement, a portion of a statement, an expression, or a value) to which pronouns refer, as specified by the programming language. Thus, the programming language defines a pronoun that refers to a specific value by convention. Language-defined referent 625 differs from programmer-defined referent 620 in that for programmer-defined referent 620, the programmer chooses the referent, but for language-defined referent 625 the language chooses the referent, and the programmer has no choice.

Explicit pronoun 630 is a programming-language-defined symbol that refers to a referent, which can be either programmer-defined referent 620 or language-defined referent 625. A programmer uses explicit pronoun 630 because it is more convenient than using the pronoun's referent.

Anonymous pronoun 635 is a type of pronoun that is identified by blank space or the lack of a symbol at a location where the programming language would otherwise expect a symbol to be.

Although this example shows two referents 620 and 625 and two pronouns 630 and 635, there could be any number of them, and all need not be present in the same program source code. Examples of programmer-defined referents, language-defined referents, explicit pronouns, and anonymous pronouns are shown in FIGS. 7–14.

Translator 610 contains pronoun-processing program 650. Translator 610 could be a compiler, interpreter, assembler, or a pre-processor for a compiler, interpreter, or assembler.

A compiler initially performs lexical analysis on the source code to separate the source code into various lexical structures of the programming language (generally known as tokens), such as keywords, identifiers, operator symbols, punctuation, and the like. Then, through syntax analysis, the compiler groups the tokens into various syntax structures of the programming language, such as expressions, declaration statements, loop statements, procedure calls, and the like. Finally, the compiler generates and optimizes executable object code for each of these structures.

An interpreter is a program that executes the source code "indirectly." The source code is translated into an intermediate format known to the interpreter that the interpreter then executes. The translation may occur all at once, or piece-by-piece. It is possible that piece-by-piece translation may translate the same piece of source code many times or not at all.

An assembler is a program that converts assembly language programs, which are understandable by humans, into executable processor instructions. Assembly language is a low-level programming language that uses abbreviations or mnemonic codes in which each statement typically corresponds to a single processor instruction or a sequence of processor instructions. An assembly language and its assembler are typically specific to a given processor.

Pronoun processing program 650 detects explicit pronoun 630 and anonymous pronoun 635, finds programmer-defined referent 620 and language-defined referent 625 to which the pronouns refer, and substitutes the referents for the pronouns, as further described below in FIGS. 7–15. Object code 615 contains coded instructions generated by translator 610 that are executable by processing unit 521, as previously described above. Pronoun processing program 650 can process pronouns using three different approaches: A) text-based substitution; B) structure-based substitution; and C) semantics-based bindings.

A) Pronoun processing program 650 can be implemented in a pre-processing phase of translator 610 that performs text-based substitutions, which has several advantages. First, because the text expansion is independent of the target-language syntax, the shorthand notations it provides can be used across target languages. In this way, C, C++, and Java, for example, can all be extended with the same set of pronouns. Second, this approach is the easiest to implement and deploy.

But, there are also limitations of using a preprocessor to implement pronouns. First, because there is no syntax checking, the program source could become embedded with syntactically invalid constructs. Second, anonymous pronouns are not possible in a preprocessor because there is no pronoun to indicate where the substituted text should be placed.

B) Pronoun processing program 650 can also be implemented as a parser extension of translator 610 using structure-based substitutions. In this case, explicit and anonymous pronouns are handled as a special case by the parser and the resulting parse tree is manipulated appropriately. Parser extensions can implement anonymous pronouns to the extent that a language grammar that includes them can be written unambiguously. Because they lack a semantic understanding of the program, parser extensions remain a form of substitution, but are more powerful than preprocessors. To illustrate, the following example can be implemented with a parser extension, but not with a preprocessor:

```
area=rectangle[i].width* $( ).height;
```

For this example, the use of the pronoun "$( )" refers to the previous left-hand side of a "." operator (i.e., rectangle [i]).

Parser extensions are still limited in their expressiveness and are unable to implement pronouns for which semantic information is necessary to resolve ambiguity. The syntax-based mechanisms for implementing pronouns are limited in power because they are essentially substitution-based techniques. That is, the referent of the pronoun is simply substituted for the pronoun, without any analysis or optimizations applied.

C) Finally, pronoun-processing program 650 can be implemented in a compiler using semantic-based substitutions, which is the most powerful technique. Making pronoun binding a part of the compiler also creates optimization opportunities. It is possible for the implementation to allocate temporary storage for pronouns efficiently. For instance, the L-value or the R-value (as appropriate) for a pronoun could be cached in storage rather than being recomputed—an advantage over substitution-based techniques. Further, this caching of an L-value may be more desirable semantics for a pronoun than the recomputation implied by the substitution-based techniques.

FIG. 6*b* is a block diagram of a symbol table, which is a primary data structure of an embodiment of the invention. FIG. 6*b* contains symbol table 675, which translator 610 uses to determine the meaning of symbols within source code 605, as further described below in FIG. 15. Symbol table 675 contains columns symbol 680, type 685, and definition 690. Various example programming-language-defined pronouns and referents are illustrated in symbol table 675. The contents of table 675 are further expounded upon in the examples of FIGS. 7–14. The contents of table 675 are exemplary only, and any suitable notation could be defined by the programming language as implemented by translator 610.

Pronoun and Referent Examples

FIG. 7 contains table 700, which illustrates code fragments that show the relationship of and examples for full names, explicit pronouns, anonymous pronouns, programmer-defined referents, and language-defined referents.

Program statements 705 and 710 illustrate referring to programmer-defined referents (expressions in this example) by their full names, which consist of identifiers and data-access operators. Referents a.b.c.d.e 711 and a.b.c.d.f 712 are programmer-defined because they are expressions that the programmer explicitly expressed. They are said to be referred to by their full name because their full name is written when referring to them.

Program statements 715, 720, 725, and 730 illustrate pronouns that refer to programmer-defined referents (program subexpressions in this example). Statements 715 and 720 accomplish the same result as statements 705 and 710, but in a way that is easier to write and just as easy to read. Likewise, statements 725 and 730 accomplish the same result as statements 705 and 710. Referents a.b.c.d 721-1 and 721-2 are programmer-defined because the programmer identifies them as referents to translator 610 by writing them as the most-recently-parenthesized expression. Pronoun 722 "$( )" refers to referent 721-1, and pronoun 731 " (ditto marks) refers to referent 721-2. Pronouns 722 and 731 are abbreviated names that are programming-language defined; that is, translator 610 recognizes them as symbols in symbol table 675. When the translator detects a pronoun, the translator searches for expressions that are enclosed in parentheses and substitutes the found expression within the parentheses (the referent) for the pronoun.

Program statements 735 and 740 illustrate pronouns that refer to programming-language-defined referents (program subexpressions in this example) by an explicit pronoun. Statements 735 and 740 accomplish the same result as statements 705 and 710, but in a way that is easier to write and just as easy to read. Referent a.b.c.d 741 is language-defined because the programming language has defined three ditto marks as a pronoun that refers to the most-recently-used expression to which "." was applied. Pronoun 742 "'' (three ditto marks) refers to referent 741.

Program statements 745 and 750 illustrate an anonymous pronoun that refers a programmer-defined referent (program subexpressions in this example). Statements 745 and 750 accomplish the same result as statements 705 and 710, but in a way that is easier to write and just as easy to read. Referent a.b.c.d 751 is programmer-defined because the programmer identifies it as a referent to translator 610 by writing it as the most-recently-parenthesized expression. Anonymous pronoun 752 refers to referent 751.

Program statements 755 and 760 illustrate pronouns that refer to programming-language defined referents (program subexpressions in this example) by an anonymous pronoun. Statements 755 and 760 accomplish the same result as statements 705 and 710, but in a way that is easier to write and just as easy to read. Referent a.b.c.d 761 is language-defined because the programming language has defined an anonymous pronoun to refer to the most-recently-used expression to which "." was applied. Anonymous pronoun 762 (blank space preceding ".f") refers to referent 761.

Pronouns are not restricted to the symbols used in FIG. 7, and the programming language could define any symbols. Likewise, identification of referents is not restricted to the symbols used in FIG. 7, and any nomenclature for identifying referents could be used.

FIG. 8 contains table 800, which illustrates code fragments that show the relationship of full names, explicit pronouns, anonymous pronouns, programmer-defined referents, and language-defined referents for subscripted arrays.

Program statements 805, 810, and 815 illustrate referring to programmer-defined referents (expressions in this example) by their full names, which consist of identifiers and data-access operators. Referents foo.diffusion__array[i] 816, foo.diffusion__array[j] 817, and foo.diffusion__array[k] 818 are programmer-defined because they are expressions that the programmer explicitly expressed. They are said to be referred to by their full name because their full name is written when referring to them.

Program statements 820, 825, and 830 illustrate explicit pronouns that refer to a programmer-defined referent (an expression referencing an array in this example). Statements 820, 825, and 830 accomplish the same result as statements 805, 810, and 815, but in a way that is easier to write and just as easy to read. Referent foo.diffusion__array 835 is programmer-defined because the programmer identifies it as a referent to translator 610 by writing it as the most-recently parenthesized expression. Pronouns 840 and 845 "$( )" refer to referent 835. Pronouns 840 and 845 are abbreviated names that are programming-language defined; that is, translator 610 recognizes them as symbols in symbol table 675. When the translator detects a pronoun, the translator searches for expressions that are enclosed in parentheses and substitutes the found expression within the parentheses (the referent) for the pronoun.

Program statements 850, 855, and 860 illustrate explicit pronouns that refer to a programming-language-defined referent (an expression referencing an array in this example). Statements 850, 855, and 860 accomplish the same result as statements 805, 810, and 815, but in a way that is easier to write and just as easy to read. Referent foo.diffusion__array 865 is language-defined because the programming language has defined three ditto marks as a pronoun that refers to the most-recently used expression to which "[ ]" was applied. Pronoun 866 ‘’’ (three ditto marks) refers to referent 865. Pronoun 866 is defined in symbol table 675.

Program statements 870, 875, and 880 illustrate anonymous pronouns that refer to a programmer-defined referent (an expression referencing an array in this example). Statements 870, 875, and 880 accomplish the same result as statements 805, 810, and 815, but in a way that is easier to write and just as easy to read. Referent foo.diffusion__array 885 is programmer-defined because the programmer identifies it as a referent to translator 610 by writing it as the most-recently parenthesized expression. Anonymous pronoun 890 refers to referent 885.

Program statements 892, 894, and 896 illustrate anonymous pronouns that refer to programming-language defined referents (an expression referencing an array in this example). Statements 892, 894, and 896 accomplish the same result as statements 805, 810, and 815, but in a way that is easier to write and just as easy to read. Referent foo.diffusion__array 898 is language-defined because the programming language has defined an anonymous pronoun to refer to the most-recently used expression to which "[ ]" was applied. Anonymous pronoun 897 (blank space preceding "[j]" and "[k]") refers to referent 898.

Pronouns are not restricted to the symbols used in FIG. 8, and the programming language could define any symbols. Likewise, identification of referents is not restricted to the symbols used in FIG. 8, and any nomenclature for identifying referents could be used.

Figure 9A:
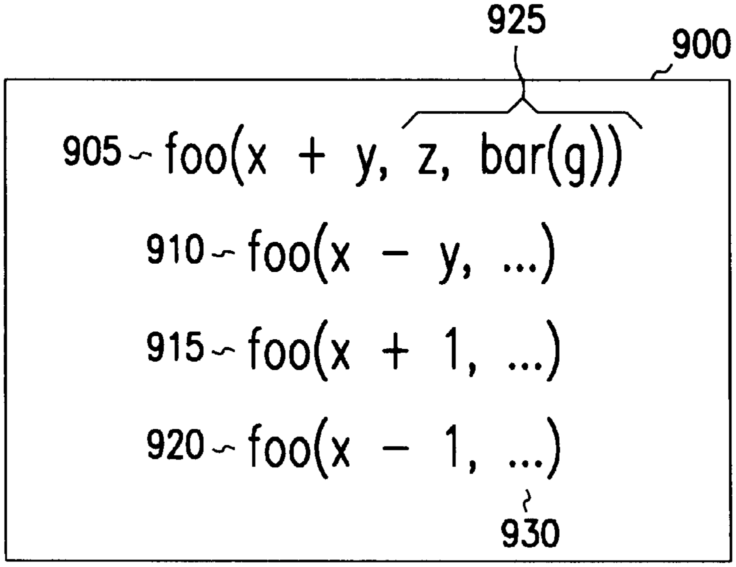
FIG. 9*a* is a block diagram that illustrates using explicit pronouns in repetitive calls to the same function.

FIG. 9*a* contains code fragment 900, which illustrates using explicit pronouns in repetitive calls to the same function. Code fragment 900 is contained within source code 605. Code fragment 900 contains program statements 905, 910, 915, and 920, which illustrate explicit pronouns that refer to a programming-language-defined referent (function parameters in this example). Referent "z, bar(g)" 925 is language-defined because the programming language has defined pronoun ". . . " (ellipsis) 930 to refer to the most recent function parameters in the same position as the ellipsis. Pronoun 930 is defined in symbol table 675.

Figure 9B:
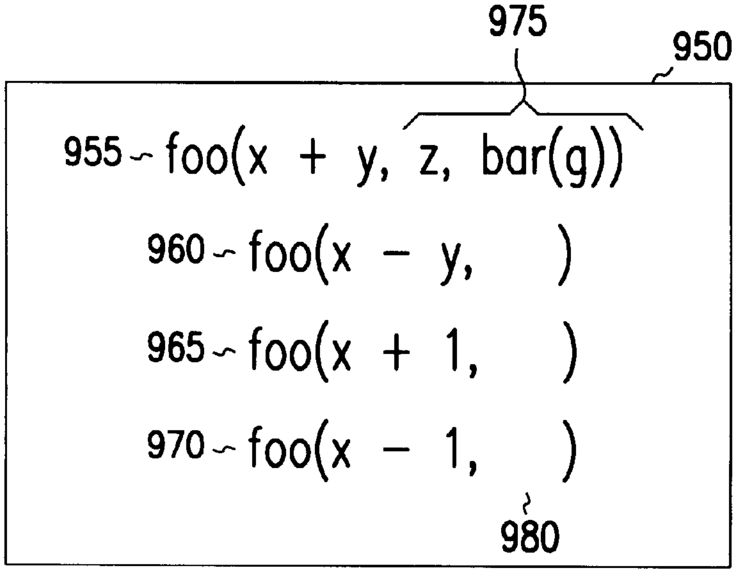
FIG. 9*b* is a block diagram that illustrates using anonymous pronouns in repetitive calls to the same function.

FIG. 9*b* contains code fragment 950, which illustrates using anonymous pronouns in repetitive calls to the same function. Code fragment 950 is contained within source code 605. Code fragment 950 contains program statements 955, 960, 965, and 970, which illustrate anonymous pronouns that refer to a programming-language-defined referent (function parameters in this example). Referent "z, bar(g)" 975 is language-defined because the programming language has defined anonymous pronoun 980 (blank space for parameters in a function call) to refer to the most recent function parameters in the same position as the anonymous pronoun.

Figure 10A:
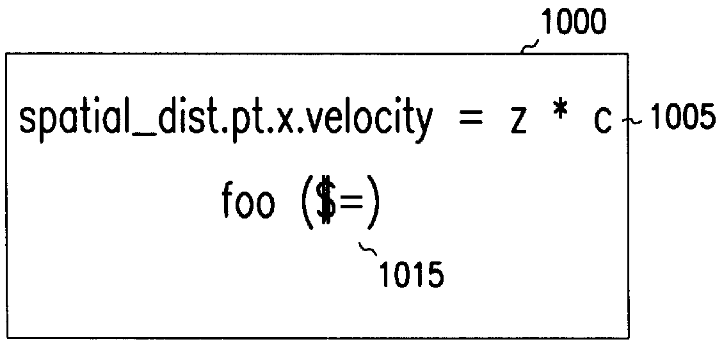
FIG. 10*a* is a block diagram that illustrates an explicit pronoun whose language-defined referent is the most-recently-assigned value.

FIG. 10*a* contains code fragment 1000, which illustrates using an explicit pronoun whose language-defined referent is the most-recently-assigned value. This is helpful because often programmers compute values into a temporary variable and then immediately use the temporary variable, simply to break up a complex computation. Likewise, sometimes an assignment is made to a complex variable, and that value is immediately accessed.

Code fragment 1000 is contained within source code 605. Code fragment 1000 contains program statements that use an explicit pronoun to a programming-language-defined referent, which is the most-recently-assigned value. Statement 1005 is an assignment statement, which results in a value assigned to expression "spatial__dist.pt.x.velocity." The referent is the assigned value. Pronoun "$=" 1015 refers to this assigned value. Pronoun 1015 is defined in symbol table 675.

Figure 10B:
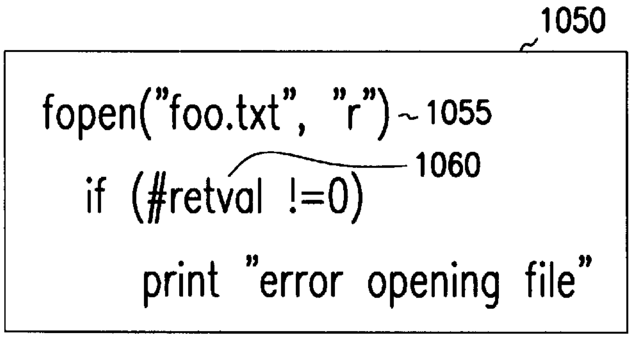
FIG. 10*b* is a block diagram that illustrates using an explicit pronoun whose language-defined referent is the most-recently-returned value from a function.

FIG. 10*b* contains code fragment 1050, which is contained within source code 605. Code fragment 1050 contains program statements that use an explicit pronoun to refer to a programming-language-defined referent, which is the most-recently-returned value. Statement 1055 is a function that returns a value. The referent is the value returned from the "fopen" function in statement 1055. Explicit pronoun "$retval" 1060 refers to this returned value. Pronoun 1060 is defined in symbol table 675.

Figure 10C:
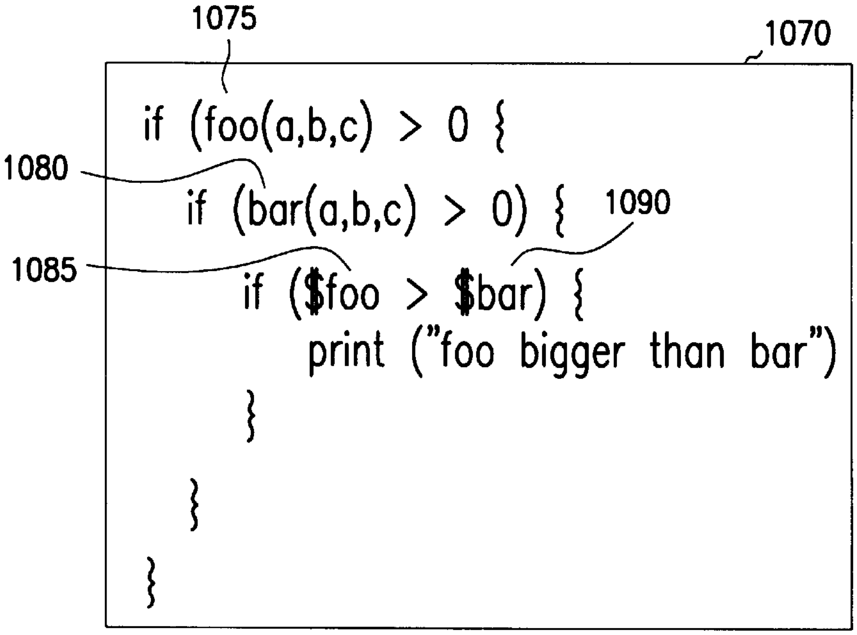
FIG. 10*c* is a block diagram that illustrates using an explicit pronoun whose referent is the most-recently-returned value of a specified function.

FIG. 10*c* contains code fragment 1070, which is contained within source code 605. Code fragment 1070 contains program statements that use an explicit pronoun to refer to a referent, which is the most-recently-returned value of a particular function. Functions "foo" 1075 and "bar" 1080 are functions that return values, which are the referents. Explicit pronouns "$foo" 1085 and "$bar" 1090 refer to the most-recently-returned values of functions 1075 and 1080, respectively.

Figure 11A:
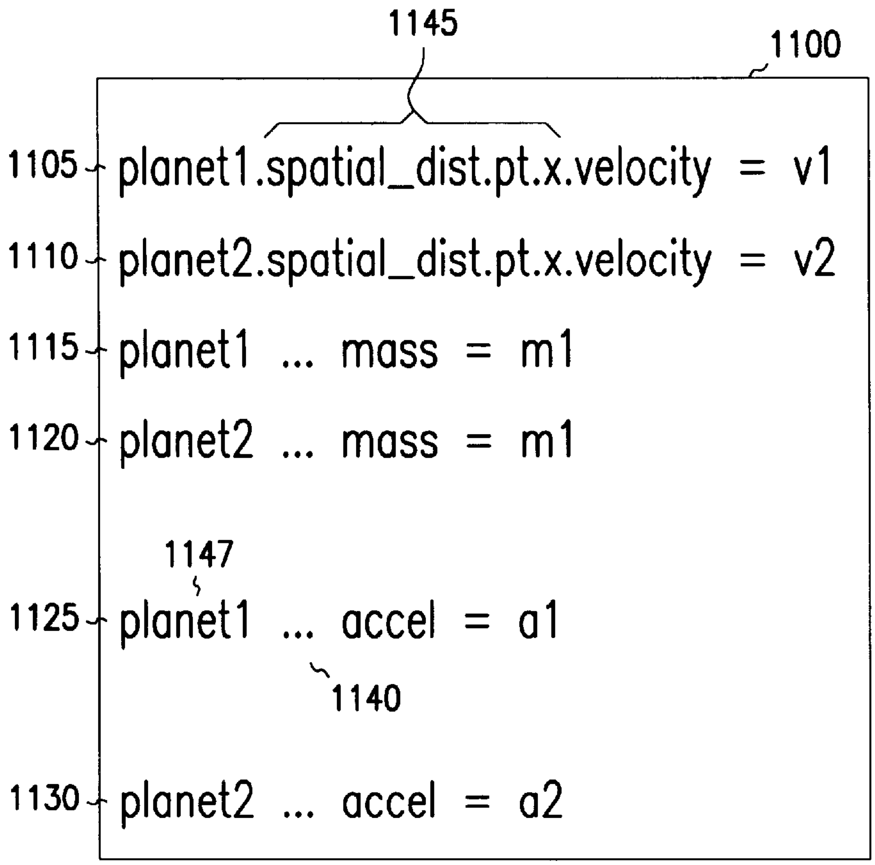
FIGS. 11*a* and 11*b* are block diagrams that illustrate using an explicit pronoun to refer to a subexpression.

FIG. 11*a* contains code fragment 1100, which is contained within source code 605. Code fragment 1100 contains program statements 1105, 1110, 1115, 1120, 1125, and 1130. Statement 1125 contains ellipsis 1140, which is an explicit pronoun that refers to programmer-defined referent 1145, which is "spatial_dist.pt.x." Referent 1145 is a portion of an expression having the same beginning as the expression of the pronoun (planet1 1147) but a different ending.

Figure 11B:
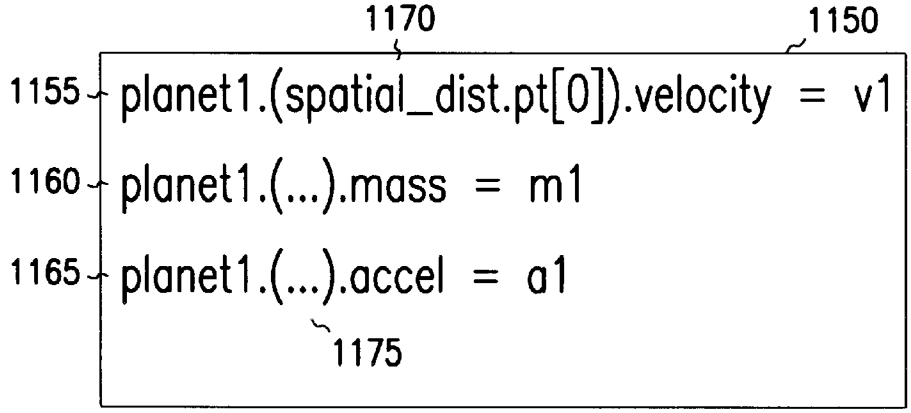

FIG. 11*b* contains code fragment 1150, which is contained within source code 605. Code fragment 1150 contains program statements 1155, 1160, and 1165. Statement 1165 contains "( . . . )" 1175, which is an explicit pronoun that refers to programmer-defined referent 1170, which is "spatial_dist.pt[0]." The programmer identifies referent 1170 to translator 610 by enclosing pronoun 1175 in parentheses.

Figure 12:
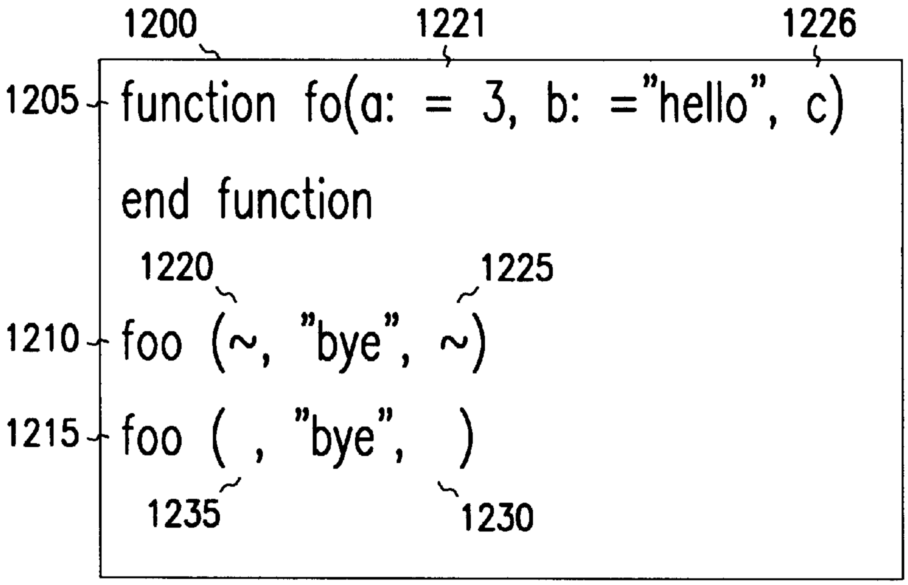
FIG. 12 is a block diagram that illustrates using explicit and anonymous pronouns to refer to default-value parameters within a function call.

FIG. 12 contains code fragment 1200, which is contained within source code 605. Code fragment 1200 contains program statements 1205, 1210, and 1215, which illustrate explicit and anonymous pronouns that refer to referents by parameter position within a function. Pronoun "~" 1220 refers to referent "3" 1221, which is the programmer-defined default value for the first parameter in the "foo" function. Pronoun "~" 1225 refers to the language-defined default value for the third parameter "c" 1226 in the "foo" function. Anonymous pronoun 1235 refers to referent "3" 1221, which is the programmer-defined default value for the first parameter in the "foo" function. Anonymous pronoun 1230 refers to the language-defined default value for the third parameter "c" 1226 in the "foo" function.

Figure 13:
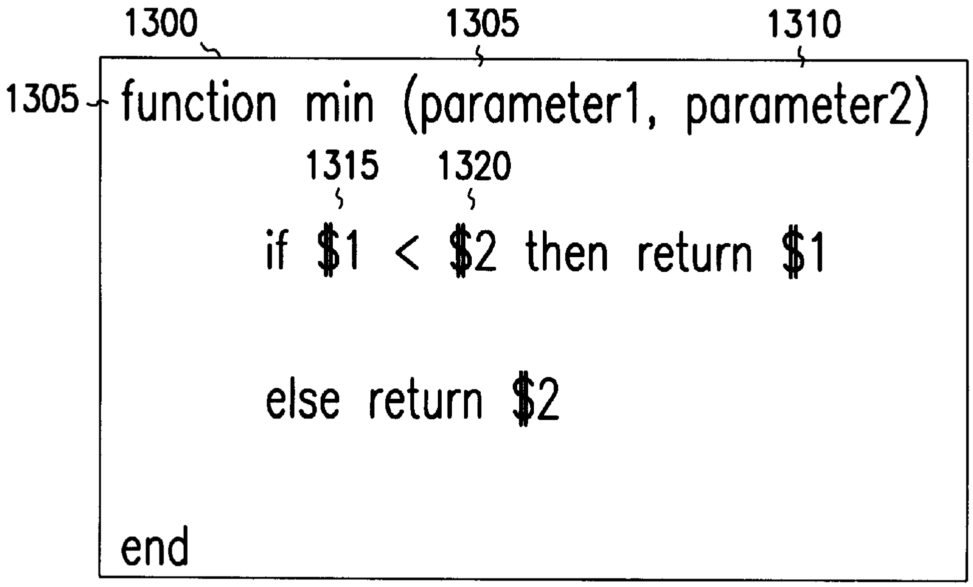
FIG. 13 is a block diagram of program statements that illustrates using explicit pronouns to refer to parameter values by their declared position.

FIG. 13 is a block diagram of program statements that illustrates using explicit pronouns to refer to passed parameter values by their declared position within a function. FIG. 13 contains program fragment 1300, which is contained in source code 605. Program fragment 1300 contains function 1305, which has two parameters: "parameter1" 1305, which is in the first declared position, and "parameter2" 1310, which is in the second declared position. Pronoun "$1" 1315 refers to referent 1305, and pronoun "$2" 1320 refers to referent 1310. Pronouns 1315 and 1320 are contained in symbol table 675.

FIGS. 14A and 14B are block diagrams of program statements that illustrate the scope of pronoun binding. FIG. 14A contains program fragment 1400, which contains referents 1405, 1410, and 1415, all of which are identified as referents by being enclosed with parentheses. Program fragment 1400 also contains explicit pronoun "$( )" 1420. FIG. 14B contains program fragment 1450, which contains referents 1455 and 1460 and pronouns 1465 and 1470. When translator 610 encounters a pronoun, such as the pronouns shown in FIGS. 14A and 14B, translator 610 determines which of the referents to use by resorting to one of four types of pronoun binding scope:

1. A "closest-definition" binding mechanism is a simple macro-substitution definition of pronoun binding that finds and uses the lexically closest parenthesized expression. Hence, in this example, pronoun 1420 refers to referent 1415.
2. A "dynamic binding" mechanism finds and uses the most-recently-executed referent. Hence, in this example, pronoun 1420 refers to either referent 1410 or referent 1415, depending on which leg of the if-then-else conditional statement is taken during dynamic control flow. Thus, translator 610 generates object code that determines which leg of the conditional statement is taken when the program is executed.
3. A "static binding" mechanism restricts bindings to obey language-defined lexical scoping conventions. In the example above, referents 1410 and 1415 would not be able to escape their scopes, so pronoun 1420 refers to referent 1405.
4. A "context-based" binding mechanism the determines the meaning of a pronoun based on the specific way in which the pronoun is being used. In FIG. 14B, there are two referents 1455 and 1460 and two uses of pronouns 1465 and 1470. In this example, the meaning of each pronoun is determined by how the pronoun is used. For pronoun 1465, because it is being used as an array, pronoun 1465 refers to the previous referent (determined by one of the three binding mechanisms, static, dynamic, or closest definition, mentioned previously) that is an array (referent 1455 in this example). Likewise, pronoun 1470 refers to the previous referent that was an object that had a field named "y". In this case, assuming that referent 1460 has a field named "y", then pronoun 1470 refers to referent 1460.

In one embodiment, the programming language determines the type of pronoun binding that translator 610 uses. In another embodiment, the user selects the type of pronoun binding that translator 610 uses.

Methods of an Exemplary Embodiment of the Invention

In the previous sections, examples of the operation of an exemplary embodiment of the invention was described. In this section, the particular methods performed by a computer system of such an exemplary embodiment are described by reference to a flowchart. The methods can be carried out by computer programs made up of computer-executable instructions. Describing the methods by reference to a flowchart enables one skilled in the art to develop such programs including such instructions to carry out the methods on a suitable computer (the computer processor executing the instructions from computer-readable media).

Figure 15:
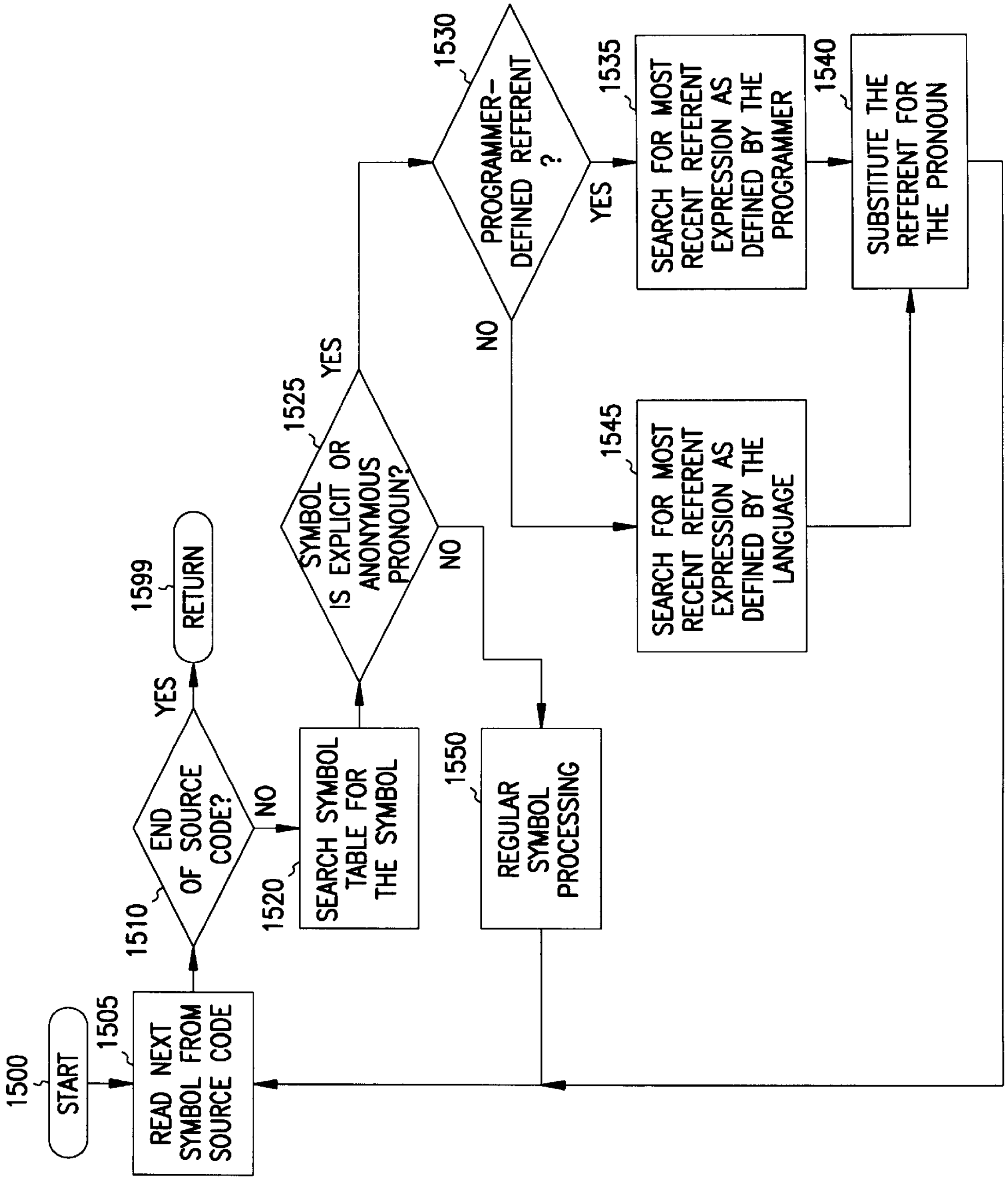
FIG. 15 is a flowchart of a method for carrying out an exemplary embodiment of the invention.

FIG. 15 is flowchart that shows the logic of pronoun processing program 650, according to an exemplary embodiment of the invention. Control begins at block 1500. Control then continues to block 1505 where pronoun-processing program 650 reads the next symbol from source code 605. Control then continues to block 1510 where pronoun-processing program 650 determines whether the end of the source code has been reached. If the determination at block 1510 is true, then control continues to block 1599 where pronoun-processing program 605 returns.

If the determination at block 1510 is false, then control continues to block 1520 where pronoun-processing program 650 searches symbol table 675 for the symbol. Control then continues to block 1525 where pronoun-processing program 650 determines whether the symbol is an explicit or anonymous pronoun. An explicit pronoun is resolved based on the current state of the parse structure that translator 610 has created and the contents of fields 680 and 685 in symbol table 675. An anonymous pronoun is resolved by determining that a symbol that was expected is not present.

If the determination at block 1525 is true, then control continues to block 1530 where pronoun-processing program 650 determines whether the symbol has a programmer-defined referent using the value in field 690 in symbol table 675.

If the determination at block 1530 is true, then control continues to block 1535 where pronoun-processing program 650 searches the source code for the most recent referent that the programmer defined. Control then continues to block 1540 where pronoun-processing program 650 substitutes the found referent for the pronoun. Control then continues to block 1505 as previously described above.

If the determination at block 1530 is false, then control continues to block 1545 where pronoun-processing program 650 searches the source code for the most-recent referent as defined by the language. Control then continues to block 1540, as previously described above.

If the determination at block 1525 is false, then the symbol is not an explicit or anonymous pronoun, so control continues to block 1550 where the regular, non-pronoun processing of translator 610 occurs. Control then returns to block 1505 as previously described above.

Conclusion

Pronouns are programming-language features that support what programmers actually want to do—write short programs quickly (i.e., "programming-in-a-hurry"), without losing readability. Pronouns reduce program redundancy while maintaining program readability. Pronouns make programs easier to write by eliminating the need to define new names (or macros) for repeated program segments. Eliminating names is a substantial benefit as programmers dislike creating names.

We claim:

1. A computerized method for translating source code, where the source code is written in a high-level programming language, comprising:

recognizing a pronoun in the source code, wherein the pronoun is defined by the programming language; and finding a referent in the source code, wherein the pronoun refers to the referent, and wherein the referent is defined by a programmer of the source code.

2. The method of claim 1, further comprising:

substituting the referent for the pronoun.

3. The method of claim 1, wherein finding the referent further comprises using closest-definition binding.

4. The method of claim 1, wherein finding the referent further comprises using dynamic binding.

5. The method of claim 1, wherein finding the referent further comprises using static binding.

6. The method of claim 1, wherein finding the referent further comprises using context-based binding.

7. The method of claim 1, wherein finding the referent in the source code occurs during a syntactic phase of a compiler.

8. The method of claim 1, wherein finding the referent in the source code occurs during a semantic phase of a compiler.

9. A computer-readable medium containing source code written in a high-level programming language, wherein the source code comprises:

a pronoun, wherein the pronoun is defined by the programming language; and a referent, wherein the pronoun refers to the referent, and wherein the referent is defined by a programmer of the source code.

10. The computer-readable medium of claim 9, wherein the pronoun comprises an anonymous pronoun.

11. The computer-readable medium of claim 9, wherein the pronoun comprises an explicit pronoun.

12. The computer-readable medium of claim 9, wherein the referent comprises a variable name.

13. The computer-readable medium of claim 9, wherein the referent comprises an expression.

14. The computer-readable medium of claim 9, wherein the referent comprises a subexpression.

15. The computer-readable medium of claim 9, wherein the referent comprises a default parameter value.

16. The computer-readable medium of claim 9, wherein the referent comprises a parameter and the pronoun refers to the parameter by position.

17. The computer-readable medium of claim 9, wherein the referent comprises a statement.

18. The computer-readable medium of claim 9, wherein the referent comprises a value.

19. A computer-readable medium, comprising:

a symbol table; and a translator comprising computer-executable instructions, which when executed comprise:

recognizing a pronoun in source code using the symbol table, wherein the pronoun is defined by a high-level programming language; and finding a referent in the source code, wherein the pronoun refers to the referent, and wherein the referent is defined by a programmer of the source code.

20. The computer-readable medium of claim 19, wherein the symbol table further comprises:

a symbol field;

a type field; and a definition of referent field.

21. The computer-readable medium of claim 19, wherein the computer-executable instructions further comprise:

substituting the referent for the pronoun.

22. A computerized method for translating source code, where the source code is written in a high-level programming language, comprising:

recognizing a pronoun in the source code, wherein the pronoun is defined by the programming language; and finding a referent in the source code, wherein the pronoun refers to the referent, and wherein the referent is defined by a programmer of the source code and the referent comprises a most-recent value.

23. The method of claim 22, further comprising:

generating object code to substitute the most-recent value for the pronoun.

24. The method of claim 22, wherein the most-recent value is assigned by an expression.

25. The method of claim 22, wherein the most-recent value is returned by a function.

26. A computer system comprising:

a processor;

memory coupled to the processor, wherein the memory contains a translator for translating source code, wherein the translator comprises instructions, and wherein the instructions when executed on the processor comprise:

recognizing a pronoun in the source code using a symbol table, wherein the pronoun is defined by a high-level programming language;

finding a referent in the source code, wherein the pronoun refers to the referent, and wherein the referent is defined by a programmer of the source code; and substituting the referent for the pronoun.

27. The computer system of claim 26, wherein the pronoun comprises one of a group consisting of an anonymous pronoun and an explicit pronoun.

28. The computer system of claim 26, wherein the referent comprises a variable name.

29. The computer system of claim 26, wherein the referent comprises a program expression.

30. The computer system of claim 26, wherein the referent comprises a program subexpression.

31. The computer system of claim 26, wherein the referent comprises a default parameter value.

* * * * *